United States Patent [19]

Yoshida et al.

[11] Patent Number: 5,065,263

[45] Date of Patent: Nov. 12, 1991

[54] TRACK FOLLOWING TRANSDUCER POSITION CONTROL SYSTEM FOR A DISK STORAGE DRIVE SYSTEM

[75] Inventors: Shuichi Yoshida, Osaka; Noriaki Wakabayashi, Hirakata; Toshio Inaji, Minoo; Hiromi Onodera, Nara, all of Japan

[73] Assignee: Matsushita Electric Industrial Co., Ltd., Osaka, Japan

[21] Appl. No.: 353,334

[22] Filed: May 17, 1989

[30] Foreign Application Priority Data

May 20, 1988 [JP] Japan .................................. 63-124346
Oct. 17, 1988 [JP] Japan .................................. 63-260815
Nov. 15, 1988 [JP] Japan .................................. 63-287966

[51] Int. Cl.$^5$ ............................................. G11B 5/596
[52] U.S. Cl. ............................ 360/77.03; 360/77.04
[58] Field of Search ............... 360/77.03, 77.04, 77.07, 360/77.08

[56] References Cited

U.S. PATENT DOCUMENTS 4,135,217  1/1979  Jacques et al. ..................... 360/77.04
4,594,622  6/1986  Wallis ................................ 360/77.04
4,616,276  10/1986  Workman ........................ 360/77.04

*Primary Examiner*—Vincent P. Canney
*Assistant Examiner*—D. Robertson
*Attorney, Agent, or Firm*—Wenderoth, Lind & Ponack

[57] ABSTRACT

A position control system for a disk storage drive system which includes a data transducer for recording and playback of the information stored in a desired data track of an information storage disk having a plurality of data storage tracks thereon, includes: a driver unit for actuating the data transducer; a position encoder of detecting a variation in movement of the data transducer and for producing a current position signal thereof; a tracking error detector for producing a tracking error signal upon detecting a positional difference of the data transducer from the desired data track; a track deflection estimator for estimating a deflection of track resulting from either eccentricity or undulation of the data track and for generating a feed-forward signal based on the estimation, and a discrete-time control loop for controlling the driver unit in accordance with the tracking error signal. The discrete-time control loop includes a compensating position calculator for calculating a compensating position command signal from the tracking error signal and an interpolation calculator for generating an interpolation signal which is supplied to the driver unit through interpolation with the feed-forward signal and the compensating position command signal so that the tracking error between the data transducer and the data track can be minimized and the traceability can be improved.

23 Claims, 12 Drawing Sheets

TRACK FOLLOWING TRANSDUCER POSITION CONTROL SYSTEM FOR A DISK STORAGE DRIVE SYSTEM

BACKGROUND OF THE INVENTION

1. Field of the Invention

The present invention relates to a position control system for allowing a data transducer to trace a data track in a disk storage device, and more particularly to a position control system for a disk storage drive system in which a data transducer can be moved to a selected data recording track at a high speed and controlled to keep its relative position to the data recording track.

2. Description of the Prior Art

As information record/playback apparatuses have remarkably been improved in performance recently, the data transducer position control system is required to be more compact in size and more accurate in operation. The position control system acts as a positioning drive device for allowing the record or playback transducer to trace a reference data track in a magnetic disk storage device or an optical disk storage device. The compactness is required for the purpose of increasing the recording capacity in a given size and the high accuracy is also needed for increasing the track density for mass storage.

Deflection of a data track which occurs during tracking, will be described. In an optical disk storage device, the amplitude of track deflection will be about several tens to some dozen tens of micrometers, considerably greater than the width (about 1.6 μm) of a track to be traced, due to the eccentricity of the center of rotation after replacement of a disk medium and/or the deflection of a rotary shaft of spindle motor for rotation of the disk. In a floppy disk drive (FDD), another kind of track deflection will result from the expansion or shrinkage of a base film of the disk medium caused by heatup in addition to the same track deflection as of an optical disk storage device. In this case, the amplitude of track deflection is smaller than that of the optical disk storage device, and the deflection is some dozen to several tens of micrometers in operation. However, the track deflection will not be negligible when the track is reduced in width for mass storage at a high track density.

For the purpose of minimizing such a track deflection, known data transducer position control systems for disk storage drive system have employed various methods which are described below.

As a first example, there is provided a method in which the deflection of a track is estimated by twice differentiating a signal which is the sum of a tracking error signal and an integration signal obtained by twice integrating an input signal to the driver unit for actuating a data transducer for tracking movement. The estimation signal corresponding to one rotation of the disk is stored in a memory and is then read out during a tracking mode and added to the input signal to the driver unit. With the use of such a resulting signal, the traceability of the data transducer can be improved, for example, as disclosed by U.S. Pat. No. 4,594,622. However, it will be difficult to put this method into practice due to the difficulty of suppressing variations in the integration or noise resulting from the differentiation.

As a second example, there is another method in which by extracting a repeatable signal component from the tracking error signal representing a deviation of the data transducer from the reference data track, a Fourier coefficient of a repeatable frequency is obtained and used to calculate a repeatable error compensation signal. The repeatable error compensation signal is then added to a driver input signal of the data transducer. With the use of such a resulting signal, the traceability of the data transducer can be improved with reference to the track deflection at a disk rotation frequency, for example, as disclosed by U.S. Pat. No. 4,616,276. However, the disadvantages of this method are that the arithmetic operation of Fourier analysis is troublesome and that the suppression of a rotation non-synchronous factor is yet unsatisfactory.

Accordingly, a prior art data transducer position control system for disk storage drive system has problems in that the control of variations and noise generated during the estimation of track deflection is too difficult to be executed in practice or in that the arithmetic operation of a repeatable error compensation signal is troublesome.

SUMMARY OF THE INVENTION

It is an object of the present invention to provide a data transducer position control system which can control tracking of a data transducer of a disk storage system so as to minimize tracking errors including a tracking error caused due to a data track deflection of an information storage disk and so as to realize a high tracking performance including high accuracy and high stability.

It is another object of the present invention to provide a practically improved data transducer position control system for disk storage drive system in which during the estimation of track deflection, no problem arises in the suppression of variations and noise and also, the process of calculation is facilitated.

A position control system for a disk storage drive system according to the present invention, which includes a data transducer for recoding and playback of information stored in a desired data track of an information storage disk having a plurality of data storage tracks thereon, comprises a driver unit for actuating the data transducer in accordance with a reference position command signal, a position encoder for detecting variations in movement of the data transducer and for producing a current position signal representing a current position of the data transducer; a tracking error detector for producing a tracking error signal upon detecting a positional difference of the data transducer from the desired data track; a track deflection estimator for estimating a deflection of a track resulting from either eccentricity or undulation of the data track and for generating a feed-forward signal based on the estimation, and a discrete-time control loop for controlling the driver unit in accordance with the tracking error signal, the loop having a compensating position calculator for calculating a compensating position command signal from the tracking error signal and an interpolation calculator for generating an interpolation signal which is applied to the driver unit through interpolation with the feed-forward signal and the compensating position command signal.

Such an arrangement as described above offers the following functions and effects.

The eccentricity or undulation of a data track is estimated by the track deflection estimator and with its resultant information data, the feed-forward control is then executed, whereby the traceability can be improved in accuracy and stability.

Since the estimation of track deflection is reckoned by the sum of the tracking error signal and the current position signal supplied from the position encoder, no problem arises in the suppression of variations or noise during the estimation and thus, the calculation procedure will be facilitated.

The feed-forward signal applied to the driver unit is advanced in phase so as to improve the traceability.

The current position of the driver unit is identified with high accuracy and resolution by the position encoder so that the minimal positioning is possible and the impact from vibration is lessened through increasing the stiffness. As a result, the high density of data tracks can be obtained.

The interpolation signal is generated by the interpolation calculator through interpolating process of a feed-forward signal and an output from the compensating position calculator and then added to the reference position command signal, whereby the traceability can be improved.

Consequently, it will be possible to provide an improved data transducer position control system for disk storage drive system.

DESCRIPTION OF THE PREFERRED EMBODIMENT

One preferred embodiment of the present invention will be described in the form of a data transducer position control system for a disk storage drive system with reference to the drawings.

Figure 1:
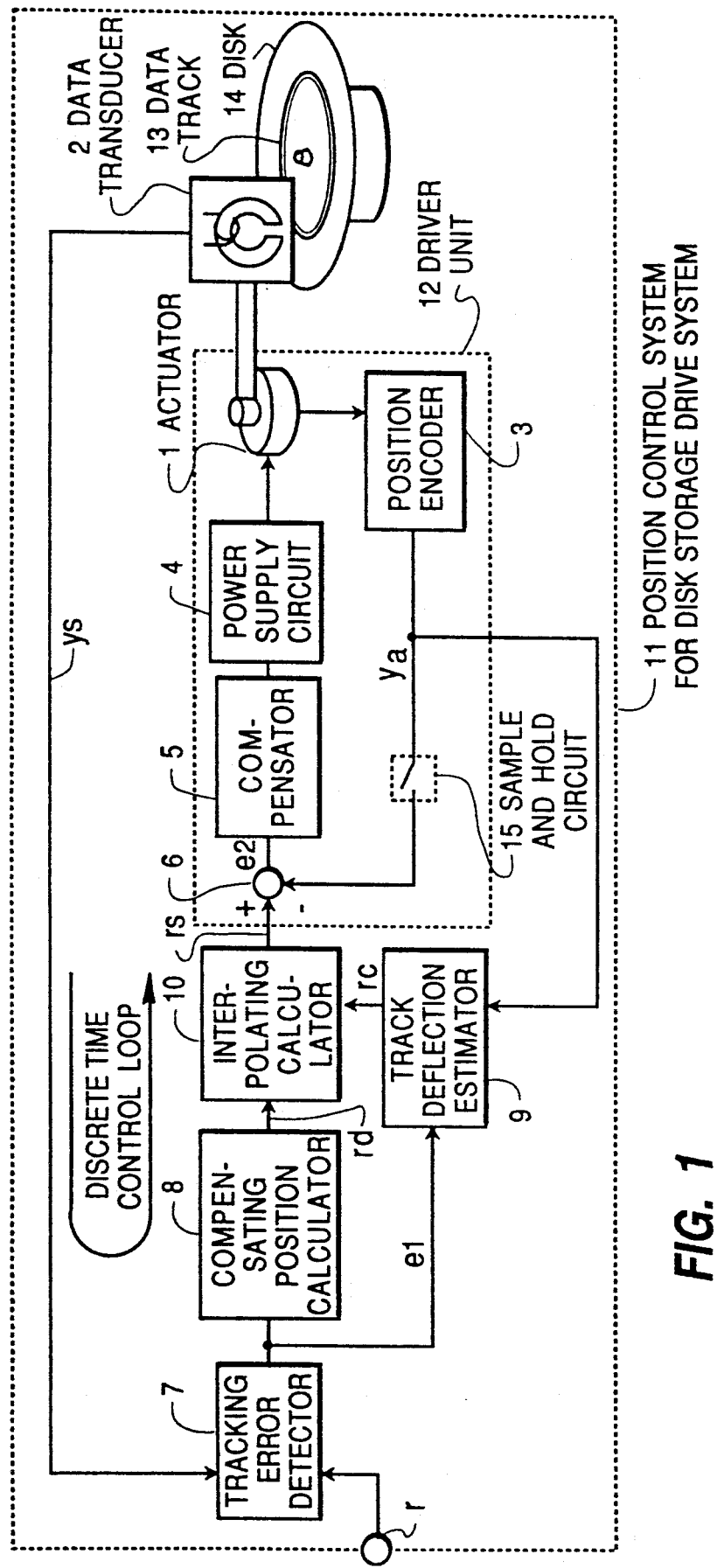
FIG. 1 is a schematic view showing the arrangement of an embodiment of the present invention in the form of a position control system for a disk storage drive system.

FIG. 1 is a block diagram of a position control system for a disk storage drive system according to the present invention. As shown in FIG. 1, element 12 is a driver unit for actuating a data transducer 2 to move about on the disk. The driver unit 12 includes an actuator 1 for movement of the data transducer 2, a position encoder 3 connected mechanically with the moving part of the actuator 1 for producing a current position signal ya upon detecting the position of the actuator 1 constantly, a compensator 5, a power supply circuit 4 for energizing the actuator 1 in accordance with an output from the compensator 5, a sample and hold circuit 15 for the continuous conversion of discrete-time signals ya derived from the position encoder 3, and a comparator 6 for calculating a difference e2 between the reference position command signal rs and the output of the sample and hold circuit 15. The compensator 5 calculates a control measure of the actuator 1 with reference to the difference e2. A servo-loop extending from the output of the position encoder 3 via the comparator 6, the compensator 5, and the power supply circuit 4 to the actuator 1, constitutes a position control loop. Particularly, the position encoder 3 detects the action of a moving part constantly and its current position output signal is a linear representation of the displacement of the data transducer 2 from a specific reference position within the movable range. The compensator 5 follows the reference position command signal rs quickly with little error. This servo-loop is an absolute positioning system and thus, will fail to provide the precise tracking along a data track which may deflect as the disk rotates.

Represented by r is a measure of eccentricity or undulation of a selected data track 13 on the disk 14 located just beneath the data transducer 2, also referred to as a deflection of the track, while ys is an absolute position of the data transducer 2. A tracking error detector 7 detects a relative position error e1 between the data track 13 and the data transducer 2. A compensating position calculator 8 produces a compensating position command signal rd through control calculation with the tracking error e1. A track deflection estimator 9 estimates the amplitude of the track deflection upon receiving both the tracking error signal e1 and the current position signal ya and produces a feed-forward signal rc. The compensating position command signal rd and the feed-forward signal rc are then supplied to an interpolation calculator 10 where a specific interpolation process is executed. The output from the interpolation calculator 10 is a reference position command signal rs.

The operation in the position control system for a disk storage drive system according to the present invention is described below.

The embodiment shown in FIG. 1 employs a tracking servo-system also termed a sector servo-system or a sampling servo-system. The system is arranged such that on the basis of each particular piece of servo information which is essential for tracking and which is embedded in the border area between fan-shaped sectors formed on the disk, a relative position signal (a tracking error signal) of the data transducer 2 with respect to the target data track is detected in a discrete-time base and then supplied as feedback for positioning in a closed loop arrangement. As shown in FIG. 1, the system is mainly constituted by a discrete-time control loop for allowing the data transducer 2 to trace the data track 13 with the tracking error signal e1 kept at a minimum. The discrete-time control loop represents a servo-loop from the data transducer 2 via the tracking error detector 7, the compensating position calculator 8, and the interpolation calculator 10 to the driver unit 12. While a deviation of the data transducer 2 from the selected data track 13 varies in time, the position of the data track 13 is identified only intermittently in the sector servo-system and thus, the tracking error signal e1 will be outputted as a discrete-time signal from the tracking error detector 7. The tracking error signal e1 is then processed a specific control calculation in the compensating position calculator 8 to generate the compensating position command signal rd. The compensating position calculator 8 has a time discrete processing system containing a deviation compensating factor or if needed, a stability compensating factor and acts primarily for the control of the offset.

The operation in the track deflection estimator 9 of FIG. 1 according to the present invention is described below. The tracking error detector 7 detects the relative tracking error signal e1 of the data transducer 2 with respect to the data track 13. When the absolute position of the data transducer 2 is ys and the position (track deflection) of the data track is r, the tracking error signal e1 is obtained from:

$$e1 = r - ys \quad (1)$$

Then, the position encoder 3 detects the position of the actuator 1 and produces a current position signal ya. The absolute position ys of the data transducer 2 is indirectly represented by the current position signal ya, which is expressed as:

$$ys \approx ya \quad (2)$$

Therefore, from the statements (1) and (2), the value r is determined by:

$$r \approx e1 + ya \quad (3)$$

The approximate equation (3) means that the track deflection of a data track can be estimated from the tracking error signal e1 and the current position signal ya. The track deflection estimator 9 includes an adder for summing the tracking error signal e1 and the current position signal ya and calculates an estimate of the track deflection from the equation (3).The resultant estimation rc of a track deflection r is then designated as a feed-forward signal. The feed-forward control is a procedure of applying an external signal to the servo-loop, in which the controllability thereof can be increased without reducing the stability when an external signal has been supplied thereto. It is hence understood that the estimation rc of the track deflection r in the position control system of the present invention is an external signal outside the servo-loop or the discrete-time control loop. More particularly, the input of this signal to the interpolation calculator 10 stands for an application to the servo-loop. Accordingly, the stability in the servo-loop remains no doubt unchanged in the event.

The reason why the traceability is improved by applying the feed-forward signal rc to the servo-loop, is as follows. As the positioning control loop constituting the driver unit 12 is a closed servo-loop system governed by the reference position command signal rs, we have:

$$rs \approx ya \quad (4)$$

Meanwhile, referring to (2), the formula (4) becomes:

$$ys \approx rs \quad (5)$$

This means that the position ys of the data transducer 2 approximately follows the reference position command signal rs. Then, if a corresponding signal to the track deflection r is given as the reference position command signal rs, the data transducer 2 will respond to the command signal. Particularly, when $rs \approx r$, we have:

$$ys \approx rs \approx r \quad (6)$$

This means that the data transducer 2 can respond to the track deflection r of the data track 13 with a fair precision. At the time, the tracking error signal e1 becomes a minimum.

However, the driver unit 12 cannot respond instantly in practice when the reference position command signal rs is inputted and thus, a time delay will occur. More specifically, the transfer properties of the driver unit 12 include a phase delay within the basic and harmonic frequency band of a disk revolution frequency contained primarily in the track deflection r of a data track. Also, another phase delay occurs which is derived from the sample and hold procedure of the discrete-time control loop. As a result, the data transducer 2 fails to trace a desired data track with the accuracy of more than a specific degree. The track deflection estimator 9 in the position control system for disk storage drive system of the present invention is thus arranged as described below.

Figure 2:
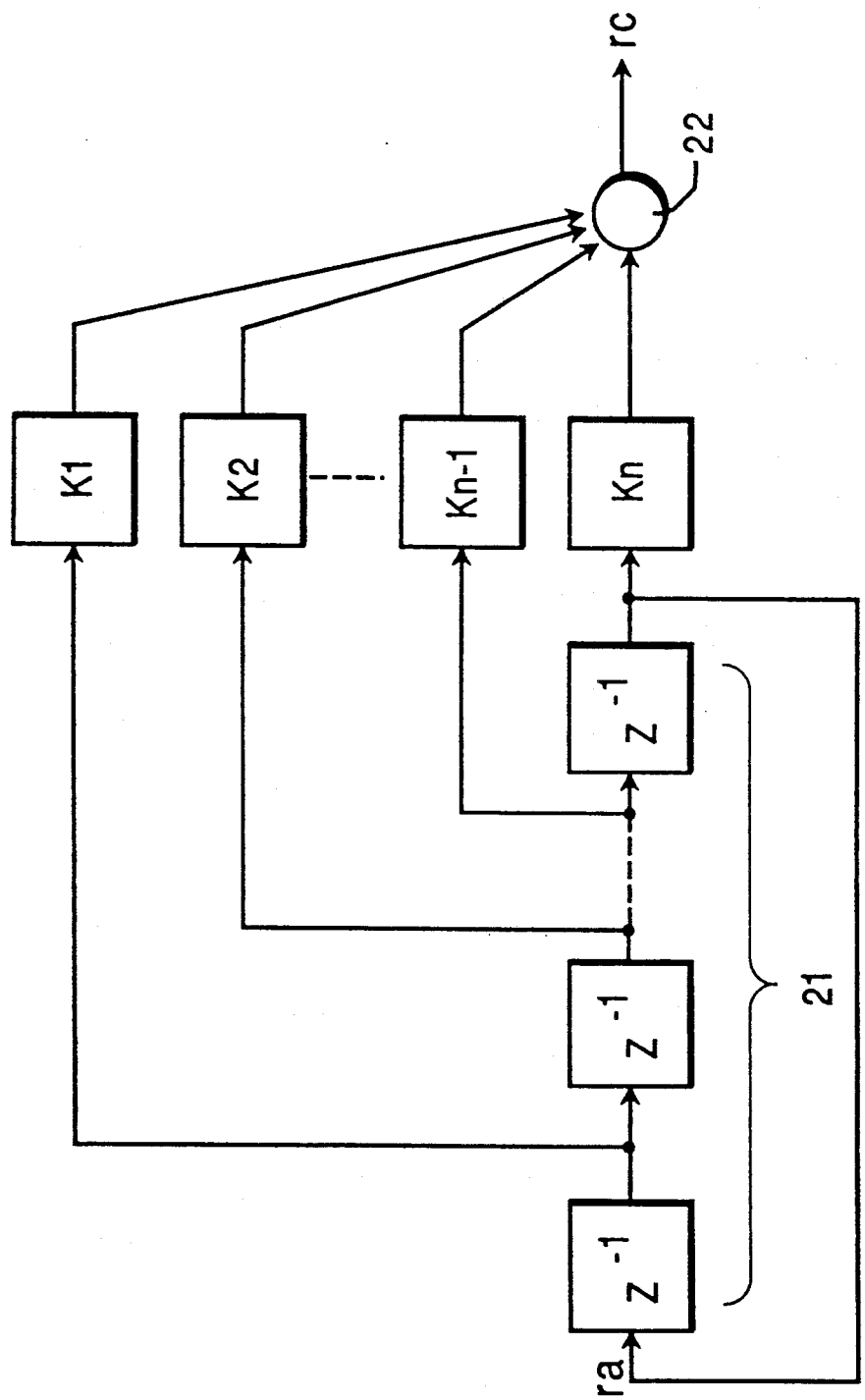
FIG. 2 is a schematic view of a track deflection estimator according to an embodiment of the present invention.

FIG. 2 is a block diagram of the track deflection estimator 9 according to an embodiment of the present invention. As shown in FIG. 2, the track deflection estimator 9 comprises a memory section 21, digital compensators K1, K2, ... Kn−1, and Kn, and an adder 22. Represented by $Z^{-1}$ is a unit memory for holding an estimation signal of track deflection ra for a time T equal to a sampling period in the discrete-time control loop. The memory section 21 is thus constituted for holding the track deflection estimation signals ra corresponding to one rotation of disk by connecting in series n (n is a positive integer) unit memories wherein n corresponds to the number of sectors. The output from the final stage of the memory section 21 is connected to the input of the memory section 21 so that the track deflection estimation signals ra held therein can pass each unit memory recursively as synchronized with the rotation of the disk. The memory section 21 may also be formed of shift registers or the like.

Each of the digital compensators K1, K2, ... Kn−1, and Kn comprises adders and/or multipliers for amplifying or digital filtering the output signal of a unit memory of the memory section 21. The adder 22 is arranged to sum up the outputs of the digital compensators for producing the feed-forward signal rc.

The operation of the track deflection estimator 9 of FIG. 2 is described below. As shown in FIG. 2, the track deflection estimation signals ra corresponding to one rotation of the disk are stored in the n unit memories and during tracking, retrieved from their respective unit memories. The estimation signals are then supplied to their respective digital compensators and summed up by the adder 22 to produce a track deflection estimation signal rc which is equal to or a bit advanced in phase of the actual track deflection r. Then, the track deflection estimation signal rc is supplied to the interpolation calculator 10 together with the output signal rd of the compensating position calculator 8 shown in FIG. 1. When the output from the interpolation calculator 10 is inputted to the driver unit 12, the actuator 1 moves to eliminate a delay in the tracking motion of the data transducer 2.

The track deflection estimator 9 may be formed of such hardware as described above or a microprocessor containing software for execution of a similar procedure.

Figure 3A:
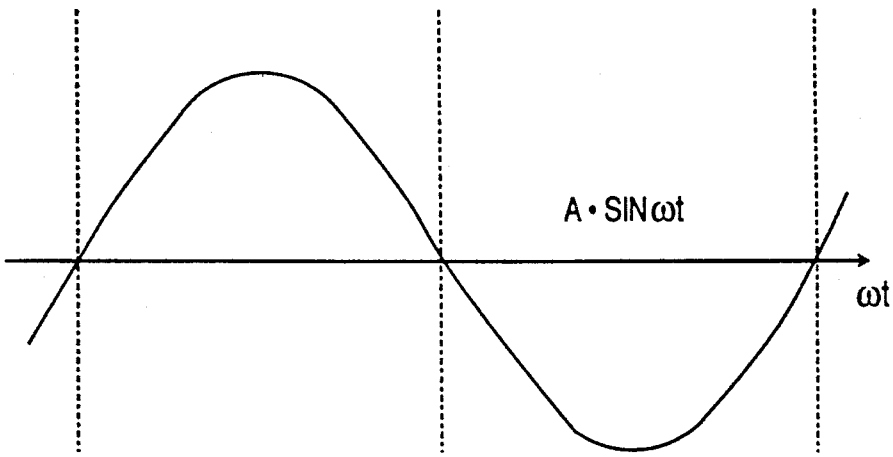
FIGS. 3(a)–3(c) are waveform diagrams of signals in the track deflection estimator.
Figure 3B:
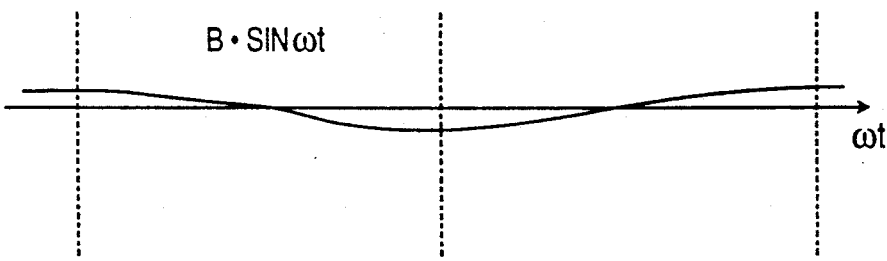
Figure 3C:
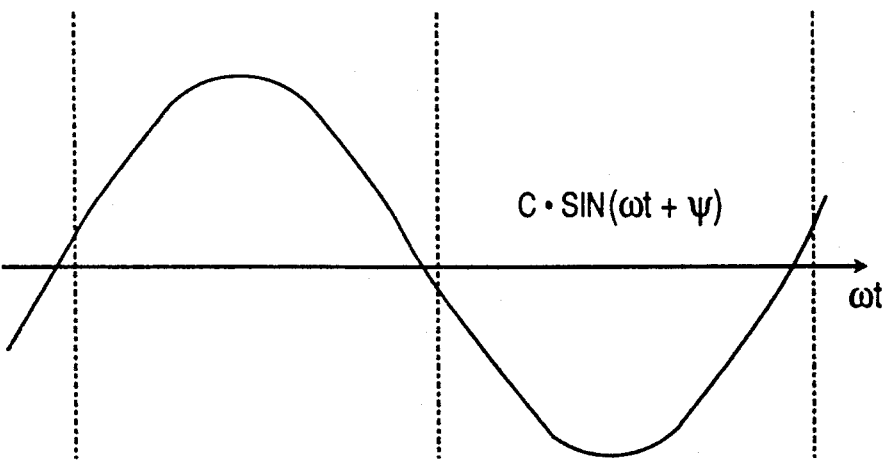

FIGS. 3(a)-3(c) are waveform diagrams showing the track deflection estimation signal ra of the track deflection estimator of FIG. 2 and respective output signals of the digital compensator Ki and the adder 22. The digital compensator Ki is a multiplier for multiplying the signal by 0.1. The letter i represents the number of a unit memory as numbered from the front to i-th and is designated as $i \approx n \cdot \frac{3}{4}$. While the digital compensators K1 to Kn−1 except Ki are removed, the Kn is an amplifier of gain 1.

Assuming that the memory section 21 of FIG. 2 has a track deflection estimation signal corresponding to one rotation of the disk, which is a periodical signal including frequency components proportional to the rotation frequency of the disk, the output signal of a unit memory numbered with i is advanced $360° \times (1 - \frac{3}{4}) = 90°$ in the phase at the frequency in one rotation of the disk as compared to the output of another unit memory numbered with n. FIG. 3(a) is the track deflection estimation signal ra; FIG. 3(b1) is a signal given by multiplying the output signal of the i numbered unit memory by a coefficient 0.1 in the multiplier, and FIG. 3(c) is the output signal rc given by summing the former signals in the adder 22. If the track deflection contains only a basic frequency, the signal waveforms of FIGS. 3(a)-3(c) are respectively described as, in which the disk rotation angular frequency is $\omega$.

FIG. 3(a): $A \cdot \sin(\omega t)$
FIG. 3(b): $B \cdot \cos(\omega t)$
FIG. 3(c1): $C \cdot \sin(\omega t + \phi)$ The relationship between the waveforms is then expressed as:

$$C \cdot \sin(\omega t + \phi) = A \cdot \sin(\omega t) + B \cdot \cos(\omega t) \tag{7}$$

When the coefficients are compared to each other, we have:

$$A = C \cdot \cos(\phi) \tag{81}$$

and $$B = C \cdot \sin(\phi) \tag{9}$$

Then, $$\tan(\phi) = B/A \tag{10}$$

When $B = 0.1 \cdot A$, we have from the equation (10):

$$\phi = 5.7° \text{ and } C = 1.005 \cdot A$$

That is to say, the output signal rc from the adder 22 is advanced 5.7° in phase and approximately equal in amplitude as compared with the signal of FIG. 3 ra. Although the signal (b) is 90° advanced from the signal of FIG. 3(a), variations will be possible. The waveforms of FIGS. 3(a)-3(c) are represented by smooth curved lines only provided that n is a quite large number. However, if n is a small number, the waveform is shown in a step form.

Figure 4:
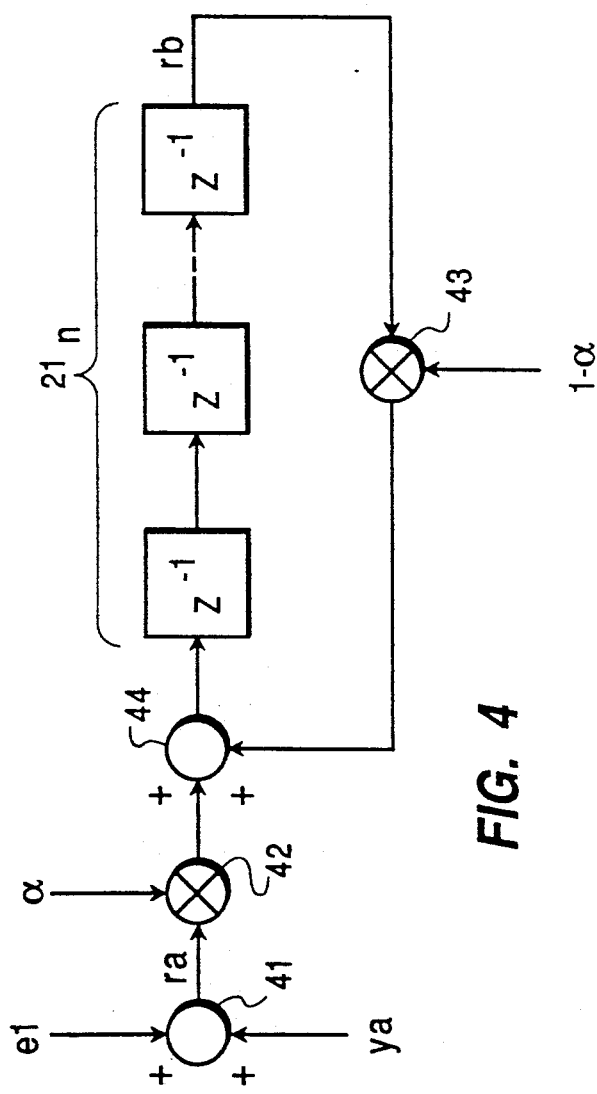
FIG. 4 is a block diagram showing the procedure of the estimation of the track deflection in the track deflection estimator.

FIG. 4 is a block diagram showing a procedure of estimating the track deflection at the track deflection estimator 9 in one embodiment of the present invention, in which the track deflection estimation signal ra is generated by an adder 41 and expressed by:

$$ra = e1 + ya \tag{11}$$

A multiplier 42 multiplies the track deflection estimation signal ra by $\alpha$ ($\alpha$ is a real number and $\alpha < 1$). Another multiplier 43 multiplies the output signal rb from the final stage of the memory section 21 by $(1 - \alpha)$. An adder for 44 adds the outputs of the multipliers 42 and 43.

The operation of the track deflection estimating procedure of FIG. 4 is described below. As shown in FIG. 4, the initial setting of a track deflection estimation signal is inputted to the memory section 21 in synchronism with a rotation of the disk while $\alpha$ is designated as 1 at the first rotation of the disk. If $\alpha$ is 0.5 at the second rotation of the disk, the track deflection estimation signal ra is multiplied by 0.5 in the multiplier 42 and also, the track deflection estimation signal rb from the memory section 21 is multiplied by 0.5 in the multiplier 43. Then, the outputs from the multipliers 42 and 43 are summed up by the adder 44 and stored again in the memory section 21. As the disk rotates continuously, this process is repeated and the track deflection estimation signal will be calculated in sequence. The coefficient in the multiplier 43 is $1 - \alpha$ while the same in the multiplier 42 is $\alpha$, so that the signals stored int he memory section 21 can be constantly normalized in amplitude.

This track deflection estimating procedure features in which the track deflection estimation signal ra stored in the memory section 21 at a particular moment of time, will decrease at a specific rate of 0.25 times the original amount in the second rotation and 0.125 times in the third rotation as the time passes. Accordingly, the remaining percentage of estimation signals which were stored in the past rotation in the memory section 21 will increase as the value of $\alpha$ becomes close to zero.

A primary object of the estimation procedure according to the present invention is to smooth amplitude variations of the track deflection estimation signal and level random noise factors contained therein through repeating the above mentioned operation.

The track deflection estimator may be formed of hardware as described above or by a microprocessor having software for execution of a similar procedure.

The procedure of track deflection estimation will further be described with respect to various particulars.

In a first case, the estimation is effected with the data transducer 2 kept movable for tracing a given track. More specifically, the track deflection estimation procedure of FIG. 4 is carried out with the discrete-time control loop 11 kept activated in the arrangement of FIG. 1.

In a second case, the estimation is carried out with the discrete-time control loop 11 kept unactivated in the arrangement of FIG. 1 while the absolute position of the data transducer 2 remains unchanged by applying a specified instruction to the drive unit 12. Particularly, the tracking error detector 7 produces a corresponding signal to the track deflection and the output of the position encoder 3 is a direct current.

Preferred locations on the disk for track deflection estimation are described below.

In a first case, similar to the above cases, the estimation is carried out with the data transducer 2 either kept movable for tracing an unspecified track or kept fixed adjacent to the track.

In a second case, the track deflection estimation is carried out at an unspecified location intermediate the track seek operations. More specifically, the estimation procedure is carried out for a period of time with the data transducer 2 kept movable for tracing an unspecified track or fixed adjacent to the track and after shifting to another track, the same procedure will be repeated again.

Between the continuous estimation procedures, another procedure such as writing of data into or reading of data from the disk may be inserted.

The timing of the track deflection estimation is described below. Such a procedure as the track deflection estimation, as described above, is repeated at each of the plural tracks, and can be employed when the track deflection is constant regardless of the diameter of the disk. Accordingly, the procedure will be inapplicable if the disk, e.g. a floppy disk, has elliptical eccentricity due to changes in the temperature of the humidity. This is because each floppy disk is distinct in elliptical eccentricity as depending on the diameter of a track and also, the writing and reading of data involves frequent seek operations throughout the tracks having respective diameters. Hence, the estimation has to be carried out at each particular data track and at a specific timing.

In a floppy disk drive system, the spindle motor will stop when the access to a disk stops for a certain period of time and the track deflection estimation should thus be carried out intermittently between access operations. The track deflection estimation requires at least a duration corresponding to one rotation of the disk and more particularly, a smoothing period taken for improved estimation with less noise while the disk is rotated 2 or 3 more times along a desired track. The track deflection estimation is preferably carried out just after the spindle motor starts rotating with the disk loaded in the floppy disk drive system and before the spindle motor stops. If the track deflection is varied during a considerable length of time when the spindle remains stopped, the estimation can be carried out when it is detected that the period between stop and restart of the spindle exceeds a predetermined time.

The operation f the track deflection estimator 9 in a track seek mode is described below.

Figure 5:
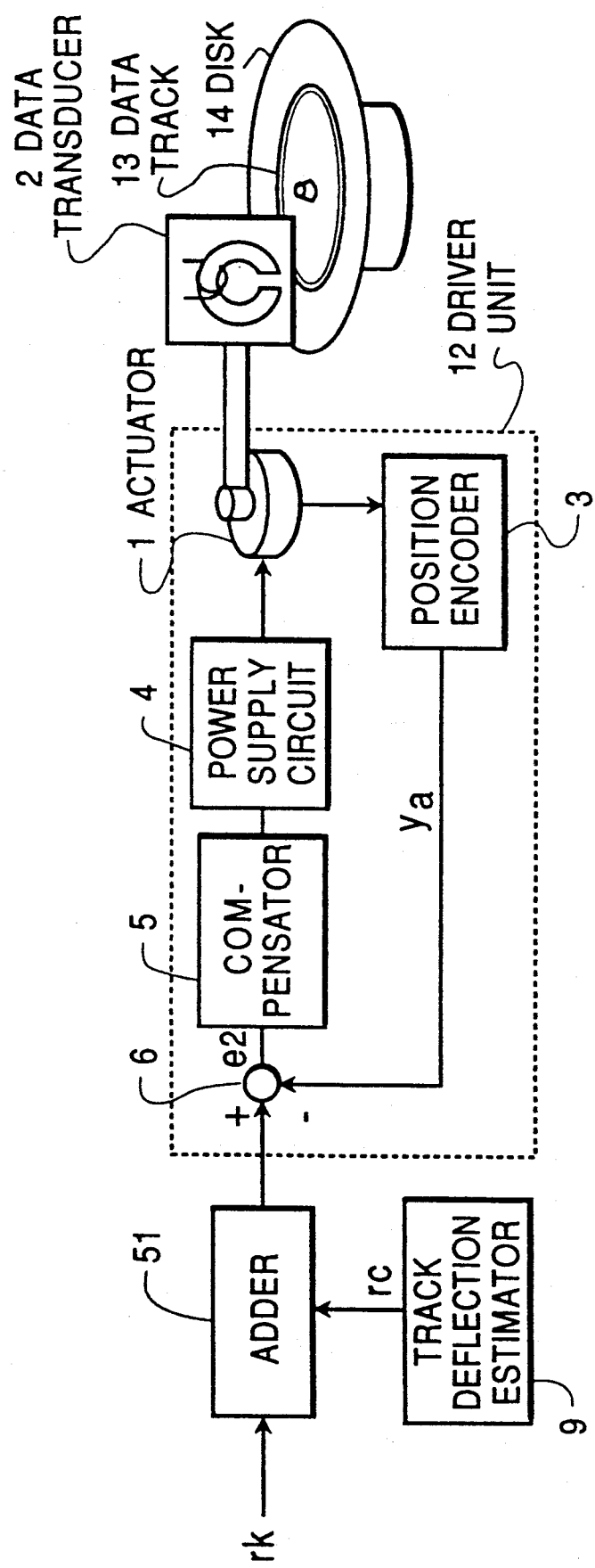
FIG. 5 is a block diagram showing the position control system for a disk storage drive system in a track seek mode.

FIG. 5 is a block diagram showing the position control system for disk storage drive system of the present invention in the track seek mode.

As shown in FIG. 5, the driver unit 12 acts as a main operator in the track seek mode. A track seek instruction rk and an output rc from the track deflection estimator 9 are applied to an adder 51 which in turn sends its output to the driver unit 12.

The memory section 21 (not shown) in the track deflection estimator 9 is formed in the same recursive arrangement as of FIG. 2 and its final stage output is supplied outwardly through no digital compensator. The driver unit 12 is actuated according to the output signal of the adder 51. When the track seek instruction rk as a position signal is entered without any output of the track deflection estimator 9 applied to the adder 51, the data transducer 2 moves from a track to another track in response to the instruction. As the rotation of the disk causes a track deflection during the track seeking, the track to which the data transducer 2 advances is displaced by a distance of deflection after the track seeking. As shown in FIG. 5, the output rc of the track deflection estimator 9 is supplied to the adder 51 together with the track seek instruction rk so as to correct the deflection of the target track caused after the track seeking.

The arrangement and operation of the interpolation calculator 10 in the embodiment of the present invention, shown in FIG. 1, is described below.

The embodiment of FIG. 1 employs a sector servo-system for which a trade-off of design is established with respect to the number of sectors.

If the number of sectors is great, the sampling frequency in discrete-time control system increases and will be available in a wide band for the control. On the contrary, a servo-area portion of the recording surface of the disk increases in size and the capacity of storage will be reduced when the formatting on the disk is completed. Hence, the number of the sectors should be kept to a minimum to increase the availability on the disk recording surface.

When the number of the sectors is small, the sampling frequency in a control system decreases and will be available only in a narrow band. This allows the traceability to be increased with much difficulty. As the controllable range is commonly adjusted so as to equal several to ten times the basic frequency of the track deflection, a control gain on the discrete-time compensator can be increased for the control of the track deflection. However, if the controllable range is limited due to the above described respects, the control gain will hardly increase. Also, if the number of the sectors is small, the length of a sampling interval will increase while a certain command signal only is applied to the actuator for drive of the data transducer. As the track changes position continuously due to track deflection, an off-track will result from a considerable degree of track deflection even if the control gain is increased.

There is provided a method of increasing the traceability with the sectors of a small number, in which the reference position command signal supplied to the driver unit 12 at discrete-time intervals is interpolated between the preceding and following signals in time. This method allows the reference position command signal to be interpolated, thus providing the same effect as the number of sectors is increased.

Figure 6:
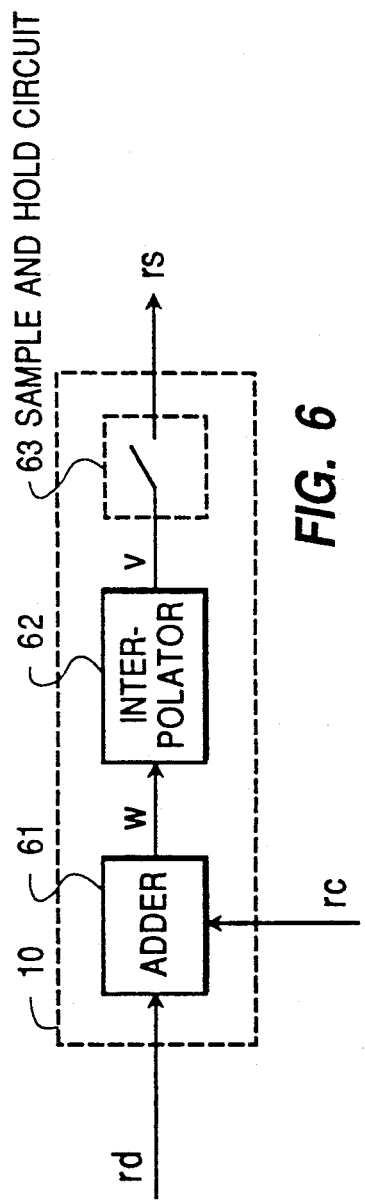
FIG. 6 is a block diagram of an interpolation calculator according to an embodiment of the present invention.

FIG. 6 is a block diagram of the interpolation calculator 10 in an embodiment of the present invention, in which element 61 is an adder for combining the compensating position command signal rd with the feed-forward signal rc; element 62 is an interpolator for performing numerical interpolation upon receiving an, output w from the adder 61, and element 63 is a sample and hold circuit for converting a discrete-time signal v of the interpolator 62 into a continuous signal. When the sampling period T of the discrete-time control loop is further interpolated at a minimal degree, the hold time Th of the sample and hold circuit 63 is expressed as:

$$Th < T \tag{12}$$

The interpolation is an arithmetic operation in which if values of a function f(x) at m points x1, x2, ... and xm are known, a value of f(x) at a point x is obtained from the known values of f(x). More precisely, an interpolation is when the value of x is between the minimum and maximum of the values of m points, but is otherwise referred to as extrapolation. Lagrange's interpolation is one of the known similar procedures.

The function and operation of the interpolator 62 will specifically be described with reference to a simple example n which m is 2, that is to say, interpolation or extrapolation is made using several factors. For the purpose of facilitating the description, the relative procedure is not distinguished between interpolation and extrapolation and will be referred to as "interpolation" hereinafter.

FIGS. 7(a)-7(e) are waveform diagrams of signals showing the track deflection r with no interpolation procedure carried out, the output w from the adder 61, the reference position command signal rs, the absolute position ys of the data transducer, and the real tracking error es incorporated in the position control system for disk storage drive system of the present invention shown in FIGS. 1 and 6. The real tracking error es is an existing tracking error between the data transducer 2 and the reference data track and is obtained from:

$$es = r - ys \tag{13}$$

Figure 7A:
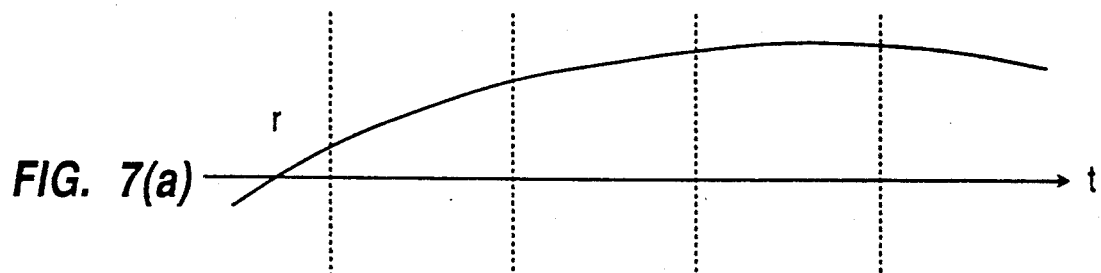
FIGS. 7(a)–7(e) are waveform diagrams of signals produced without interpolative calculations in the position control system for a disk storage drive system.
Figure 7B:
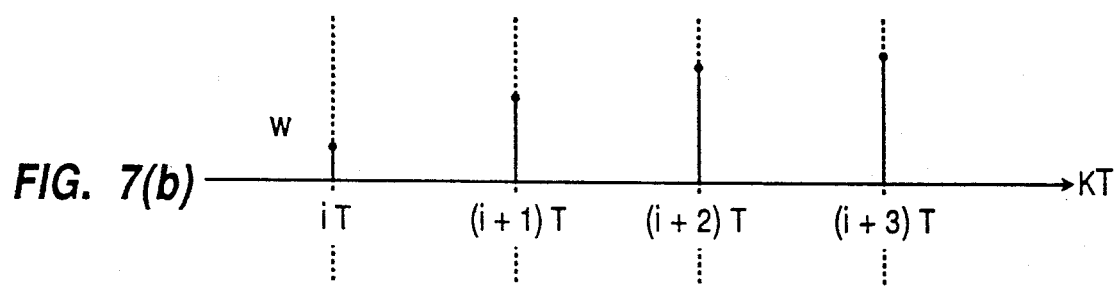
Figure 7C:
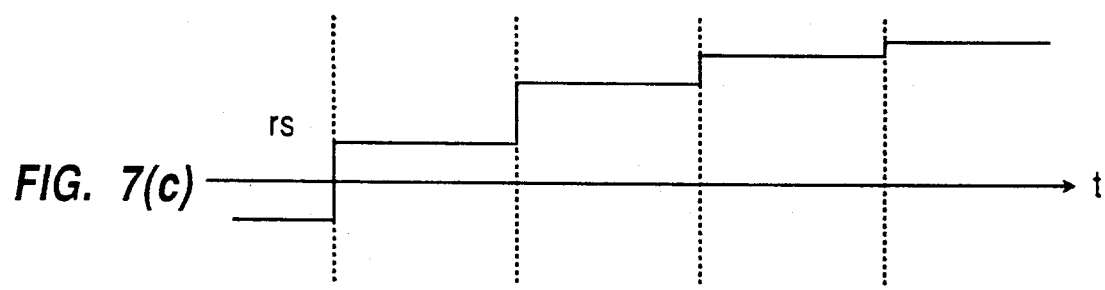
Figure 7D:
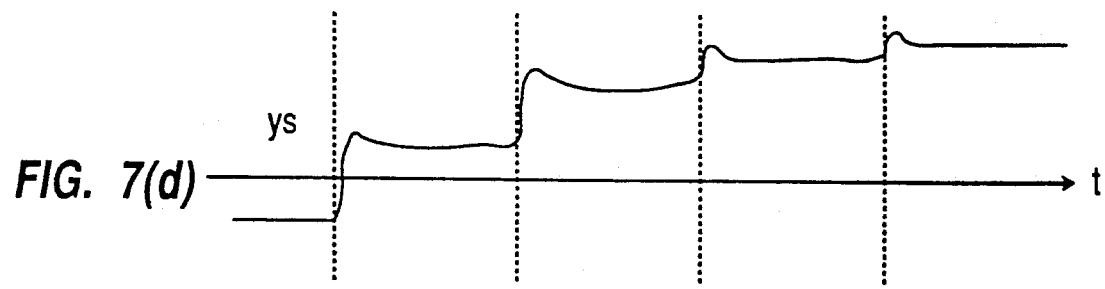
Figure 7E:
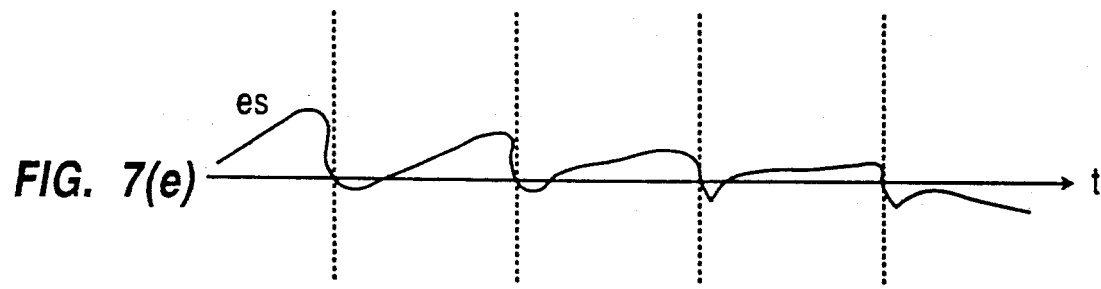

FIG. 7(b) is a discrete-time signal designated on the abscissa axis kT (k is a positive integer) at sampling intervals of T.

As shown in FIGS. 7(a)-7(e), the reference position command signal rs which is obtained by sampling and holding the output w of the adder 61, is expressed in a wide step waveform. The data transducer position ys or a response of the driver unit to the signal rs is also shown in a wide step waveform. Accordingly, the real tracking error es has an oscillatory waveform of great amplitude.

Figure 8:
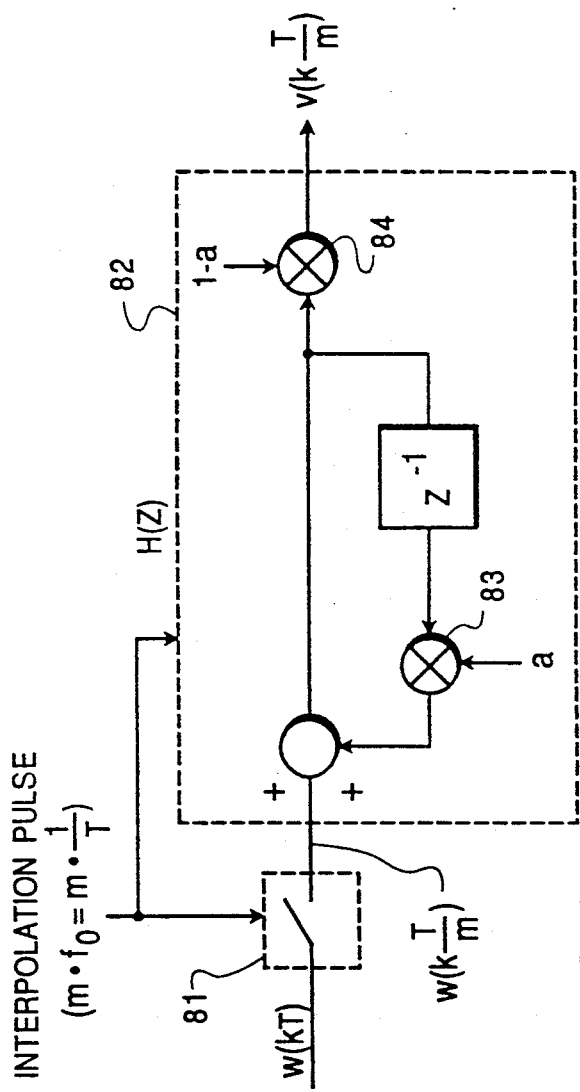
FIG. 8 is a block diagram showing an interpolator for execution of a first interpolation process.

FIG. 8 is a block diagram showing interpolator for executing a first interpolation procedure, in which element 81 is a sampler for sampling at intervals of period T/m the input signal w which has been sampled at T period interval; element 82 is a digital filter H(z) provided in the form of an integral filter for smoothing an input signal. Both the sampler 81 and the digital filter 82 are actuated according to an interpolation pulse having a period T/m. Elements 83 and 84 are multipliers for multiplying the signal by a (a is a positive real number and a < 1) and by 1 − a respectively. Element $Z^{-1}$ is a register for holding data for the sampling period T/m.

The interpolator may be formed of a hardware as described above or by a microprocessor having software for executing a similar procedure.

Figure 9A:
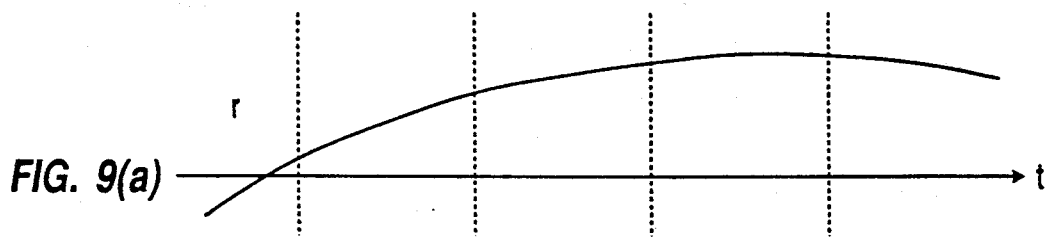
FIGS. 9(a)–9(f) are waveform diagrams of signals obtained through interpolation by the first interpolation process.
Figure 9B:
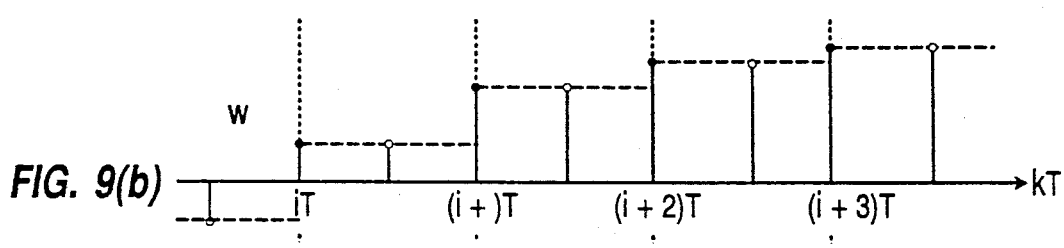
Figure 9C:
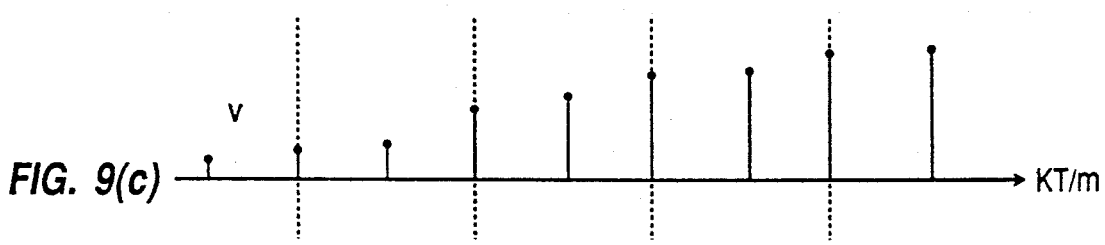
Figure 9D:
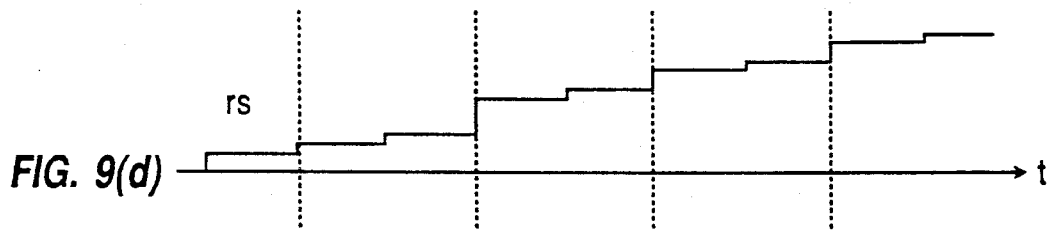
Figure 9E:
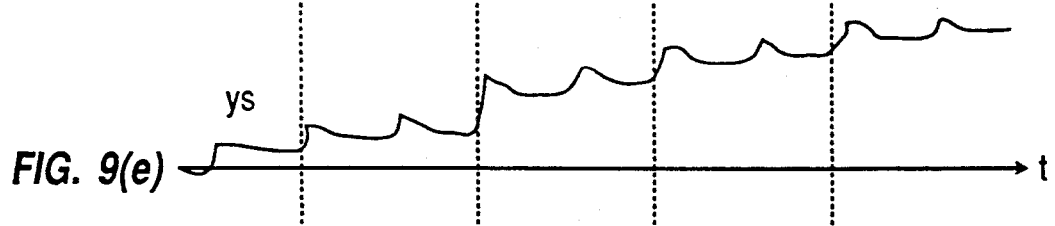
Figure 9F:
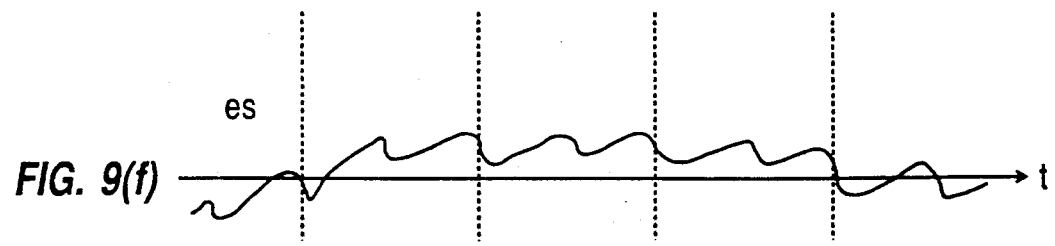

FIGS. 9(a)-9(f) are waveform diagrams of signals interpolated by the first interpolation procedure (where m=2). As shown in FIG. 9(b), a sample signal denoted by the black dot is the input w [kT) uninterpolated. An interpolated signal is represented by the white dot. The sample signal w (k. T/m) is then supplied to the digital filter 82 which is actuated in accordance with the T/m period interpolation pulse. The signal v smoothed by the digital filter 82 is held by the sample and hold circuit 63 of FIG. 6 for output of a signal rs which has a small step waveform as compared with the signal rs of FIG. 7(c). Consequently, the real tracking error es will be small in the amplitude and moderate in its waveform. Additionally, by increasing the interpolation points m, the output es will be smooth in its response and further smaller in amplitude. The output w from the discrete-time compensator is sampled to a considerable degree and passed through a digital integral filter, whereby the track traceability can be improved.

Figure 10:
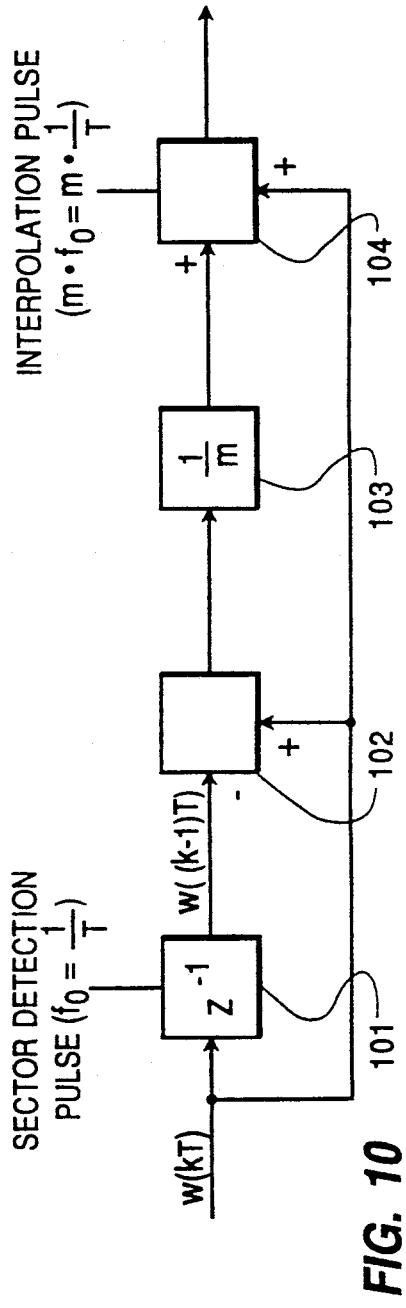
FIG. 10 is a block diagram showing an interpolator for execution of a second interpolation process.

FIG. 10 is a block diagram showing another arrangement of an interpolator for execution of a second interpolation procedure, in which element 101 is a register actuated in synchronism with a sector detection pulse for holding the input signal w for a period of T. Element 102 is an adder for calculating a difference between the current input w(kT) and the register output w(k−1)T). Also, element 103 is a multiplier for multiplying the output of the adder 102 by 1/m (m=2) and element 104 is another adder actuated in response to an interpolation pulse for summing up the current input w(kT) and the output of the multiplier 103.

The interpolator may be formed of hardware as described above or by a microprocessor having software for executing a similar procedure.

Figure 11A:
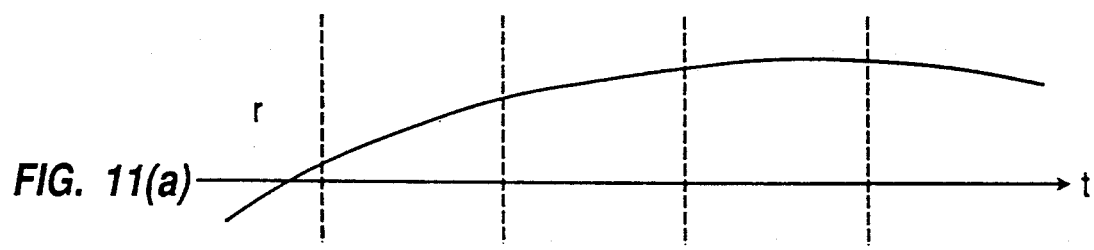
FIGS. 11(a)–11(e) are waveform diagrams of signals obtained through interpolation by the second interpolation process.
Figure 11B:
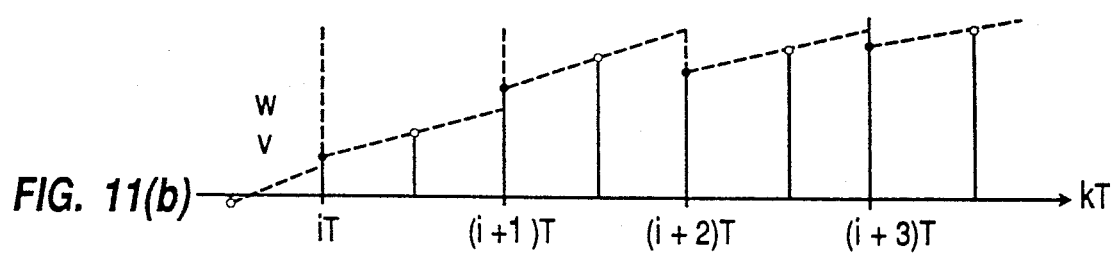

FIGS. 11(a)-11(e) are waveform diagrams of signals interpolated by the second interpolation procedure. As shown in FIG. 11(b), a sample signal denoted by the black dot is the input w(kT) uninterpolated. An interpolation is carried out in which the signal values (represented by the white dots) are obtained by dividing the extension (represented by the broken line) which extends across the summit of the current sample signal w(kT) through the summit of the preceding sample signal w(k−1)T), by the number m in the following sample period.

Figure 11C:
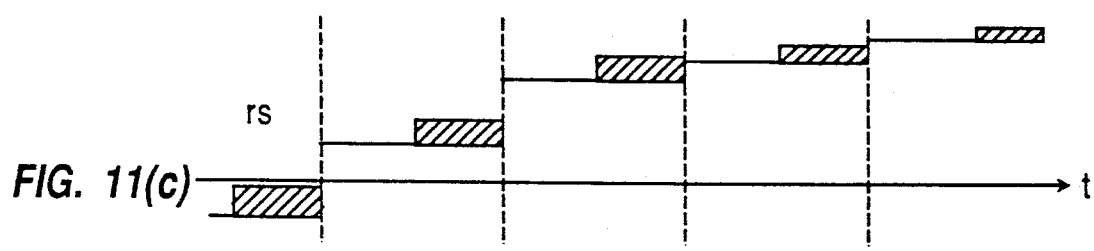
Figure 11D:
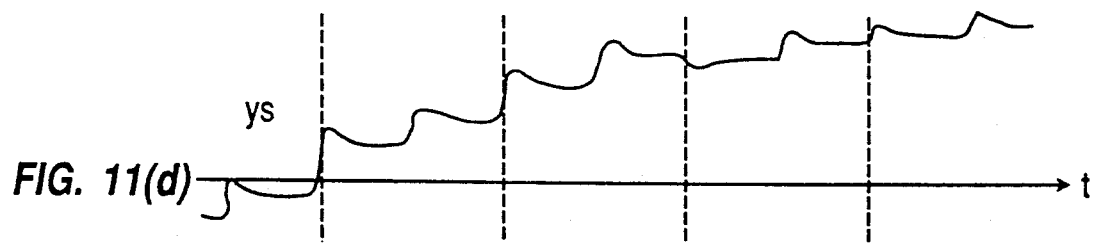
Figure 11E:
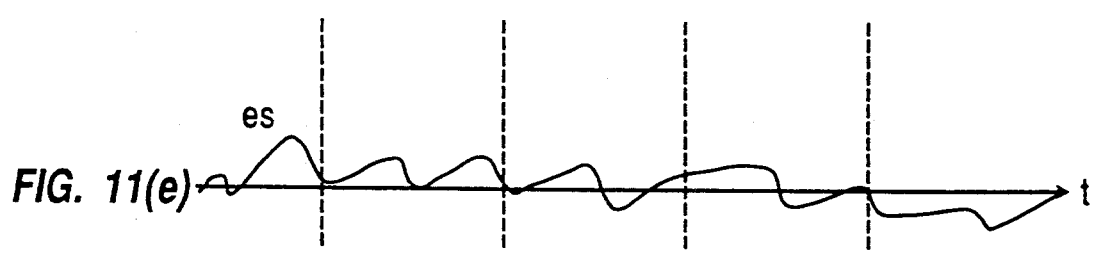

The interpolated output v (represented by both the black dots and the white dots) is held by the sample and hold circuit 63 of FIG. 6 for output of a signal rs, as shown in FIG. 11(c) where the hatching area represents the result of interpolation. Particularly, the signal rs has a small step waveform as compared with that of FIG. 7(c) and thus, the response ys of the driver unit 12 becomes moderate in the waveform as compared with that of FIG. 7(d). Consequently, the real tracking error es will be small in amplitude and moderate in its waveform. Additionally, by increasing the interpolation points m, the output es will be smooth in its response and further smaller in amplitude. The track traceability can thus be improved by interpolation of the signal w.

A further arrangement of the interpolator is described below, in which the discrete-time signal w is preliminarily held through learning or in reference to a repeatable period for the purpose of an arithmetic operation of interpolation which is then carried out in the first and second interpolation procedures with either the current discrete-time output w or a discrete-time output produced before several sample periods.

Figure 12:
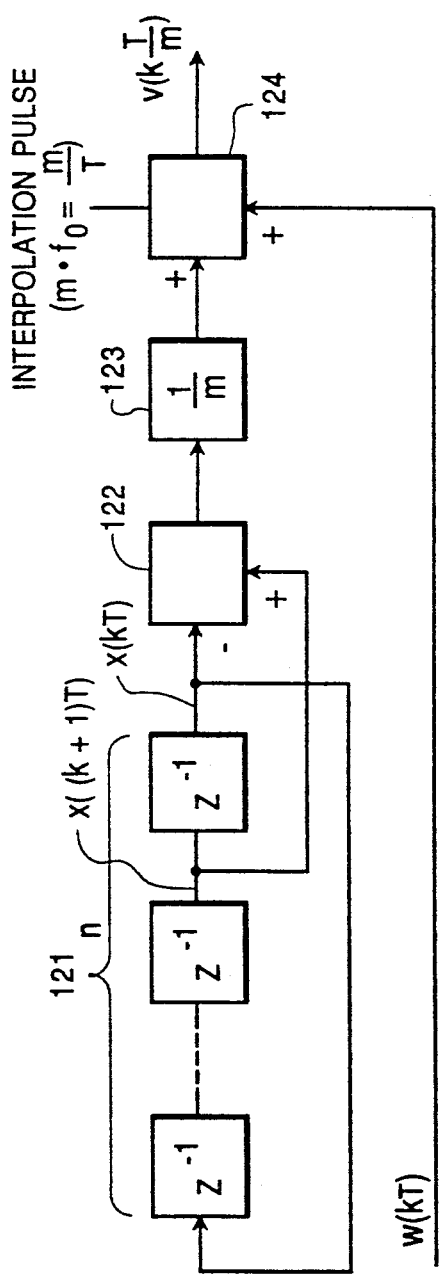
FIG. 12 is a block diagram showing an interpolator for execution of a third interpolation process.

FIG. 12 is a block diagram showing an interpolator for execution of a third interpolation procedure, in which element 121 is a memory section actuated in synchronism with a sector detection pulse for holding a signal w corresponding to one rotation of the disk. Element 122 is an adder for calculating a difference between the output x(kT) and the output x((k+1)T). Also, element 123 is a multiplier for multiplying the output of the adder 122 by 1/m (m=2) and element 124 is another adder actuated in response to an interpolation pulse for summing up the current input w(kT) and the output of the multiplier 123.

The interpolator may be formed of hardware as described above or by a microprocessor having software for executing a similar procedure.

Figure 13A:
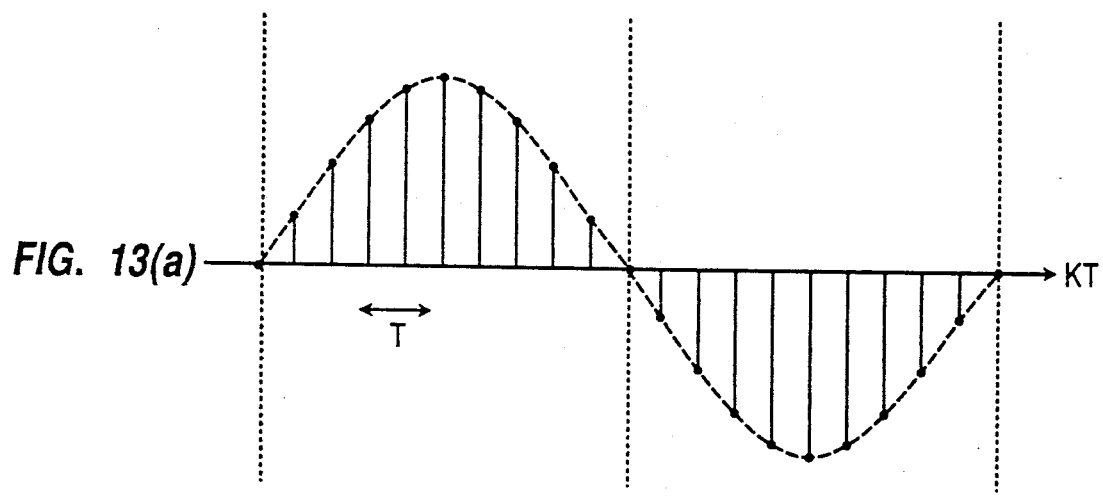
FIGS. 13(a)–13(b) are waveform diagrams of signals obtained through interpolation by the third interpolation process.
Figure 13B:
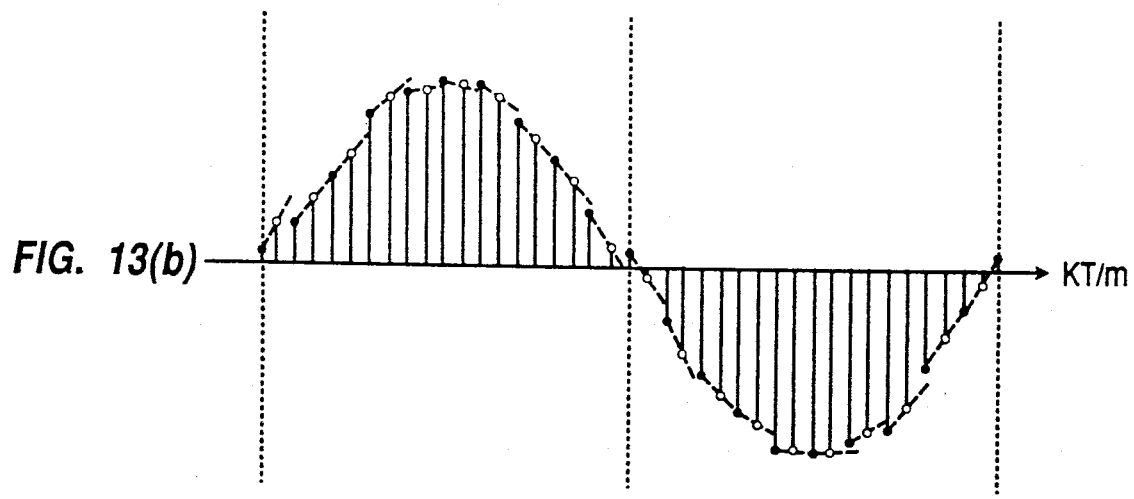

FIGS. 13(a)–13(f) are waveform diagrams of signals interpolated by the third interpolation procedure. Shown in FIG. 13(a) is a discrete-time signal put into the memory section 121 through learning or in reference to a repeatable period. As shown in FIG. 13(b), a sample signal denoted by the black dot is the time-discrete signal w(kT) supplied to the interpolator in real time. The interpolation according to the sample signal stored in the memory section 121 is carried out in which a sloping portion (represented by the broken line) between the current sampling time and the following sampling time is obtained from the sample signal stored in the memory section 121 and is used for interpolation of the following sample period (represented by the white dot). This procedure is made on each sample input for interpolation in correspondence to one rotation of the disk.

The interpolated signal v is then held by the sample and hold circuit 63 of FIG. 6 for output of a signal rs. The signal rs is supplied to the driver unit 12 and thus, the track traceability can thus be improved as well as in the first or second interpolation procedure.

Figure 14A:
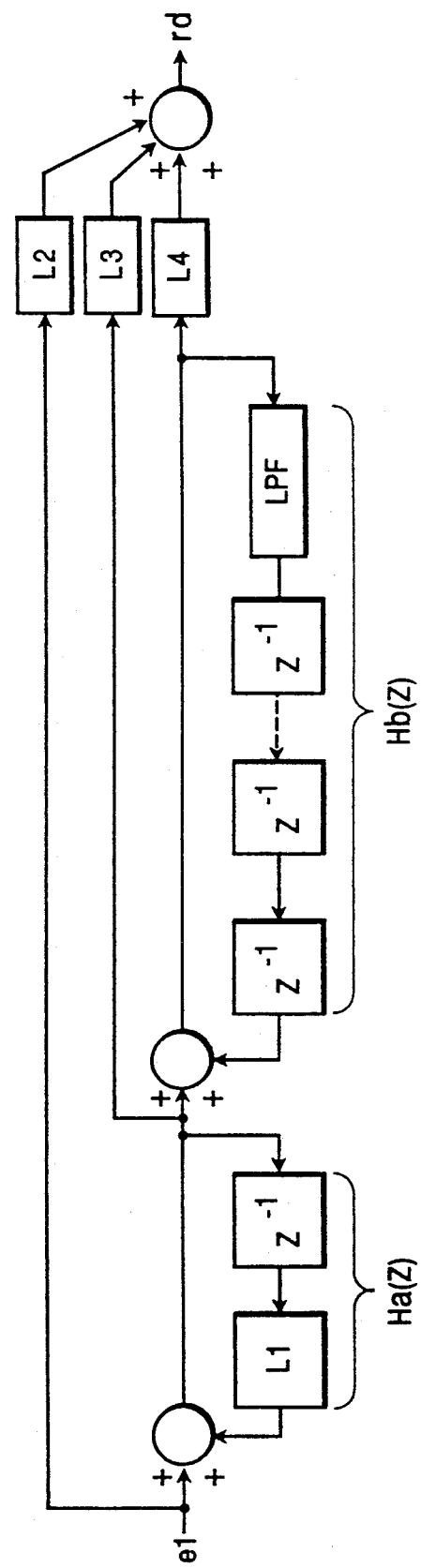
FIG. 14(a) is a block diagram of a compensating position calculator according to an embodiment of the present invention.
Figure 14B:
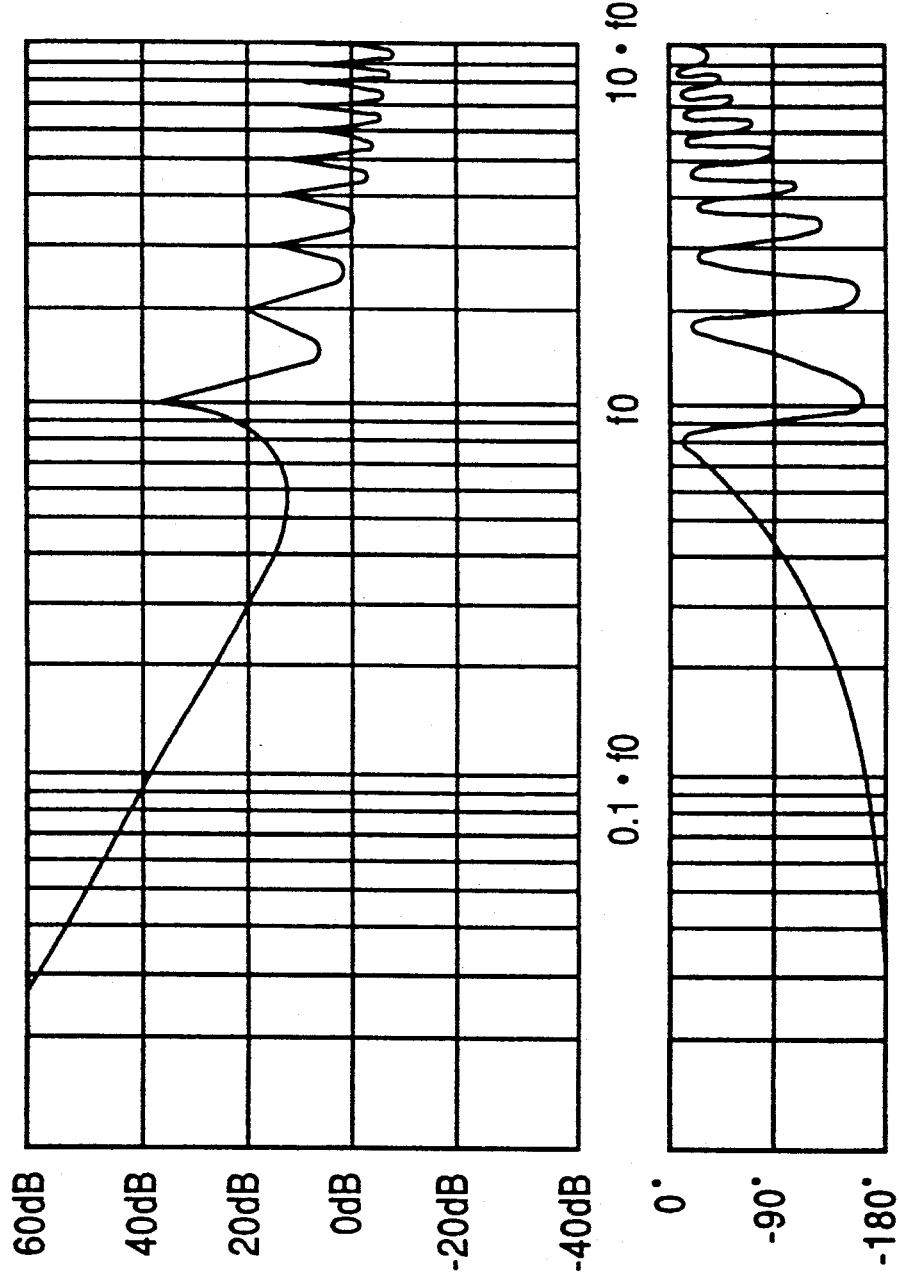
FIG. 14(b) is a chart of frequency properties showing a transfer function from the tracking error e1 to the compensating position command signal rd.

FIG. 14(a) is a block diagram of a compensating position calculator 8 in an embodiment of the present invention, in which element $Z^{-1}$ is a unit memory for holding a discrete-time signal of sample time T; element Ha(z) is a low-band compensation digital filter; element Hb(z) is a recursive digital filter, and element LPF is a low-pass filter contained within the recursive digital filter for stabilization. Multipliers L1, L2, ... and L4 are also provided for multiplying the input signal by a coefficient. FIG. 14(b) shows the frequency characteristics of a transfer function from the tracking error e1 to the compensating position command signal rd. While f0 is a rotation frequency of the disk, a high gain is apparently given in the harmonic frequency component which is a multiplication of the basic frequency f0 by an integer.

The arrangement of the compensating position calculator is not limited to the above mentioned system and may be formed of a low-band compensator capable of substantially increasing the gain of a low frequency component included in the tracking error signal.

What is claimed is:

1. A position control system for a disk storage drive system including a data transducer of record and playback of information stored in a given data track of an information storage disk having a plurality of data storage tracks thereon, comprising:
   an actuator means for actuating the data transducer to move the data transducer;
   a position encoder means for detecting a variation in movement of the data transducer and producing a current position signal representing a current position of the data transducer;
   a drive means for driving the actuator means in accordance with a reference position command signal and the current position signal;
   a tracking error detector means for detecting a positional difference of the data transducer from a desired data track and producing a tracking error signal;
   a track deflection estimator means for estimating a deflection of a track resulting from either eccentricity or undulation of the data track and generating a feed-forward signal on the estimation;
   a discrete-time control loop means for controlling the drive means in accordance with the tracking error signal, including a compensating position calculator means for calculating a compensating position command signal from the tracking error signal and an interpolation calculator means for generating an interpolation signal which is applied to the drive means through interpolation with the feed-forward signal and the compensating position command signal; and
   said track deflection estimator means including a first adder means for summing us the tracking error signal and the current position signal of the position encoder means, a memory means comprising a limited number of unit memories preliminarily containing track deflection estimation signals corresponding to outputs of the first adder means according to the rotation of the disk, a limited number of compensator means for receiving both a corresponding signal to an output of each unit memory and a corresponding signal to an output of the first adder means, and a second adder means for summing up corresponding signals to outputs of the plural compensator means so that it can output a corresponding signal to an output of the second adder means as a feed-forward signal.

2. A position control system as defined in claim 1, wherein the track deflection estimator means generates and smooths down a given track deflection estimation signal during the preceding plural rotations of the disk in accordance with both the corresponding signal to the output of the first adder means and the estimation signal preliminarily stored in the memory means.

3. A position control system as defined in claim 2, wherein the track deflection estimator means further includes a multiplier means, for multiplying by a constant the corresponding signal to the output of the memory means and an adder means for summing up a corresponding signal to an output of the first adder means and the corresponding signal to the output of the multiplier means, and applies a corresponding signal to an output of the adder means to the memory means.

4. A position control system as defined in claim 2, wherein the track deflection estimator means generates and smooths down a track deflection estimation signal during the preceding plural rotations of the disk in relation to any of the tracks on the disk.

5. A position control system as defined in claim 2, wherein the track deflection estimator means generates and smooths down track deflection estimation signals during the preceding plural rotations of the disk in relation to a plurality of the tracks on the disk.

6. A position control system as defined in claim 1, wherein the track deflection estimator means performs an estimation of track deflection at least either just after a startup of rotation of the disk or just before a stop of the same.

7. A position control system as defined in claim 1, wherein the track deflection estimator means performs an estimation of track deflection when a duration between a stop and a restart of rotation of the disk exceeds a predetermined time.

8. A position control system as defined in claim 1, wherein the track deflection estimator means allows the track deflection estimation signals preliminarily stored in the limited number of the unit memories to recursively move between the unit memories in response to the rotation of the disk during a track seek operation and also, applies the output of the memory means to the drive means.

9. A position control system as defined in claim 1, wherein the interpolation calculator means includes an adder means for summing up the feed-forward signal and the compensating position command signal a memory means for storage of an output signal of the adder means, and a calculator means having at least a summing function for interpolation according to the output signal of the adder means and an output signal of the memory means.

10. A position control system as defined in claim 1, wherein the interpolation calculator means includes a memory means for holding a corresponding signal to at least either the compensating position command signal or the feed-forward signal through learning or in reference to a repeatable period and a calculator means having at least a summing function for interpolation according to an output signal of the memory means.

11. A position control system for a disk storage drive system including a data transducer for record and playback of a position encoder means for detecting a variation in movement of the data transducer and producing a current position signal representing a current position of the data transducer;

a drive means for driving the actuator means in accordance with a reference position command signal and the current position signal;

a tracking error detector means for detecting a positional difference of the data transducer from a desired data track and producing a tracking error signal;

a track deflection estimator means for estimating a deflection of a track resulting from either eccentricity or undulation of the data track and generating a feed-forward signal on the estimation;

a discrete-time control loop means for controlling the drive means ion accordance with the tracking error signal, including a compensating position calculator means for calculating a compensating position command signal from the tracking error signal and an interpolation calculator means for generating an interpolation signal which is applied to the drive means through interpolation with the feed-forward signal and the compensating position command signal' said track deflection estimator means including a first adder means for summing up the tracking error signal and the current position signal of the position encoder means, a memory means comprising a limited number of unit memories preliminarily containing track deflection estimation signals corresponding to outputs of the first adder means according to the rotation of the disk, a limited number of compensator means for receiving both corresponding signal to an output of each unit memory and a corresponding signal to an output of the first adder means, and a second adder means for summing up corresponding signals to outputs of the plural compensator means so that it can output a corresponding signal to an output of the second adder means as a feed-forward signal, and further including a multiplier means for multiplying by a constant the corresponding signal to the output of the memory means, and a third adder means for summing up the corresponding signal to the output of the first adder means and a corresponding signal to an output of the multiplier means; and applying a corresponding signal to an output of the third adder means to the memory means;

said track deflection estimator means being adapted to perform an estimation of a track deflection at least either just after a startup of rotation of the disk or just before a stop of the same and when a duration between the stop and a restart of rotation of the disk exceeds a predetermined time; and said compensating position calculator means including a low frequency compensator means for increasing a gain of low frequency component contained in the tracking error signal.

12. A position control system as defined in claim 11, wherein the interpolation calculator means includes an adder means for summing up the feed-forward signal and the compensating position command signal, a memory means for storage of an output signal of the adder means, and a calculator means having at least a summing function for interpolation according to the output signal of the adder means and an output signal of the memory means.

13. A position control system as defined in claim 11, wherein the interpolation calculator means includes a memory means for holding a corresponding signal to at least either the compensating position command signal or the feed-forward signal through learning or in reference to a repeatable period and a calculator means having at least a summing function for interpolation according to an output signal of the memory means.

14. A position control system for a disk storage drive system including a data transducer for record and playback of information stored in a given data track of an information storage disk having a plurality of data storage tracks thereon, comprising:

an actuator means for actuating the data transducer to move the data transducer;

a position encoder means for detecting a variation in movement of the data transducer and producing a current position signal representing a current position of the data transducer;

a drive means for driving the actuator means in accordance with a reference position command signal and the current position signal;

a tracking error detector means for detecting a positional difference of the data transducer from a desired data track and producing a tracking error signal;

a track deflection estimator means for estimating a deflection of a track resulting from either eccentricity or undulation of the data track and generating a feed-forward signal on the estimation; and a discrete-time control loop means for controlling the drive means in accordance with the tracking error signal, including a compensating position calculator means for calculating a compensating position command signal from the tracking error signal, and an interpolation calculator means for generating an interpolation signal which is applied to the drive means through interpolation with the feed-forward signal and the compensating position command signal, wherein the interpolation calculator means includes a memory means for holding a corresponding signal to at least either the compensating position command signal or the feed-forward signal through learning or in reference to a repeatable period, and a calculator means having at least a summing function for interpolation according to an output signal of the memory means.

15. A position control system as defined in claim 14, wherein the compensating position calculator means includes a lower frequency compensator means for increasing a gain of low frequency component contained in the tracking error signal.

16. A position control system as defined in claim 14, wherein the compensating position calculator means includes a recursive digital filter for having a high suppression gain in both the fundamental and harmonic frequency components of a disk rotation frequency contained in the tracking error signal.

17. A position control system as defined in claim 14, wherein the position encoder means is adapted to output a current position signal representing a displacement of the data transducer from a reference point linearly in an entire movable range of the data transducer.

18. A position control system as defined in claim 14, wherein the drive means includes a comparator means for producing a deviation signal corresponding to a difference between the reference position signal and the current position signal of the position encoder means, and a power supply means for applying an electric power to the actuator means in response to an output signal of the comparator means.

19. A position control system for a disk storage drive system including a data transducer for record and playback of information stored in a given data track of an information storage disk having a plurality of data storage tracks thereon, comprising:

an actuator means for actuating the data transducer to move the data transducer;

a position encoder means for detecting a variation in movement of the data transducer and producing a current position signal representing a current position of the data transducer;

a drive means for driving the actuator means in accordance with a reference position command signal and the current position signal;

a tracking error detector means for detecting a positional difference of the data transducer from a desired data track and producing a track error signal;

a track deflection estimator means for estimating a deflection of a track resulting from either eccentricity or undulation of the data track and generating a feed-forward signal on the estimation; and a discrete-time control loop means for controlling the drive means in accordance with the tracking error signal, including a compensating position calculator means for calculating a compensating position command signal from the tracking error signal, and an interpolation calculator means for generating an interpolation signal which is applied to the drive means through interpolation with the feed-forward signal and the compensating position command signal, wherein the interpolation calculator means includes an adder means for summing up the feed-forward signal and the compensating position command signal, a memory means for storage of an output signal of the adder means, and a calculator means having at least a summing function for interpolation according to the output signal of the adder means and an output signal of the memory means.

20. A position control system as defined in claim 19, wherein the compensating position calculator means includes a low frequency compensator means for increasing a gain of low frequency component contained in the tracking error signal.

21. A position control system as defined in claim 19, wherein the compensating position calculator means includes a recursive digital filter for having a high suppression gain in both the fundamental and harmonic frequency components of a disk rotation frequency contained i the tracking error signal.

22. A position control system as defined in claim 19, wherein the position encoder means is adapted to output a current position signal representing a displacement of the data transducer from a reference point linearly in an entire movable range of the data transducer.

23. A position control system as defined in claim 19, wherein the drive means includes a comparator means for producing a deviation signal corresponding to a difference between the reference position signal and the current position signal of the position encoder means, and a power supply means for applying an electric power to the actuator means in response to an output signal of the comparator means.

* * * * *